(12) United States Patent
Kunz

(10) Patent No.: US 7,383,668 B1
(45) Date of Patent: Jun. 10, 2008

(54) VINYL BEAD WITH FLEX WINGS

(76) Inventor: Roland Kunz, 4949 South 30th, Omaha, NE (US) 68107

( * ) Notice: Subject to any disclaimer, the term of this patent is extended or adjusted under 35 U.S.C. 154(b) by 8 days.

(21) Appl. No.: 11/642,302

(22) Filed: Dec. 20, 2006

(51) Int. Cl.
*E04B 1/00* (2006.01)

(52) U.S. Cl. ........................... 52/255; 52/287.1

(58) Field of Classification Search ............... 52/255, 52/256, 257, 287.1, 288.1, 717.05, 717.03, 52/254
See application file for complete search history.

(56) References Cited

U.S. PATENT DOCUMENTS

| | | | | |
|---|---|---|---|---|
| 2,851,741 A * | 9/1958 | Stemples | ...................... | 52/255 |
| 2,904,856 A * | 9/1959 | Robinson | ...................... | 52/255 |
| 3,090,087 A * | 5/1963 | Miller | ...................... | 52/287.1 |
| 3,307,313 A * | 3/1967 | Tatum | ...................... | 52/367 |
| 4,722,153 A * | 2/1988 | Hardy | ...................... | 52/255 |
| 4,876,837 A * | 10/1989 | Kelly et al. | ................ | 52/287.1 |
| 5,442,886 A * | 8/1995 | Iacobelli | ...................... | 52/255 |
| 5,904,016 A * | 5/1999 | Koenig et al. | ................ | 52/255 |
| 5,943,835 A * | 8/1999 | von Saint-George | ....... | 52/287.1 |
| 6,073,406 A * | 6/2000 | Kearney | ...................... | 52/287.1 |
| 6,119,420 A * | 9/2000 | Koenig et al. | ................ | 52/255 |
| 6,363,673 B1 * | 4/2002 | Robertson | ...................... | 52/255 |
| 6,447,872 B1 * | 9/2002 | Larson | ...................... | 428/77 |
| 6,691,477 B2 * | 2/2004 | Koenig, Jr. et al. | ........ | 52/287.1 |
| 6,779,313 B2 * | 8/2004 | Smythe, Jr. | .................. | 52/255 |
| 2003/0056455 A1 * | 3/2003 | Harel | ...................... | 52/287.1 |

\* cited by examiner

*Primary Examiner*—Robert Canfield
*Assistant Examiner*—Jessie Fonseca

(57) ABSTRACT

A plastic drywall accessory includes an elongated strip of plastic having a nose and at least one wing projecting outwardly from a stepped edge of the nose. A hinge of flexible plastic is interposed between the nose and wing, so the wing will closely conform to an associated wall surface. In a first embodiment, the accessory is co-extruded, with the wing and nose formed of a rigid plastic material and the hinge formed of a flexible plastic material. In a second embodiment, the accessory is co-extruded, with the nose formed of a rigid plastic material and the hinge and wing formed of a flexible plastic material.

5 Claims, 1 Drawing Sheet

VINYL BEAD WITH FLEX WINGS

CROSS-REFERENCES TO RELATED APPLICATIONS (Not Applicable).

STATEMENT AS TO RIGHTS TO INVENTIONS MADE UNDER FEDERALLY SPONSORED RESEARCH AND DEVELOPMENT (Not Applicable).

INCORPORATION-BY-REFERENCE OF MATERIAL SUBMITTED ON A COMPACT DISC (Not Applicable)

BACKGROUND OF THE INVENTION (1) Field of the Invention

The present invention relates generally to drywall construction, and more particularly to an improved mud-on cornerbead and trim product with flexible wing portions.

(2) Description of Related Art Including Information Disclosed Under 37 CFR 1.97, 1.98

Current building construction utilizes sheets of drywall, commonly referred to as "wallboard," to form the surfaces of interior walls of buildings. Drywall is typically formed of sheets of plaster sheathed in an outer wrapping of heavy construction paper.

In drywall construction, joints between adjacent sheets of drywall are usually covered by paper tape extending lengthwise along the joint. To finish exterior corners in wallboard construction, metal corner beads and bullnose beads are typically installed. Similarly, metal trim is used to protect and finish a wallboard edges at window and door jams, while expansion joints are inserted between sheets of wallboard at predetermined intervals within buildings.

The above-described corner bead and trim products include metal flanges projecting outwardly, which are perforated with circular holes or elongated slots, so that the trim product may be fastened to the drywall panels using nails or the like. Wet plaster is then smoothed into place to cover the metal flanges, and edges of the plaster are smoothed and feathered to cover and conceal the metal edges.

Another type of corner bead on the market is referred to as a "tape-on" or "mud-on" bead. Conventional tape-on bead includes a metal bead with a strip of paper covering the exterior surface of the metal, with wings projecting outwardly from the legs of the corner angle. Wet plaster or joint cement ("mud") secures these paper wings to the drywall to secure the corner bead in position. Thus, the bead is fastened with mud, rather than nails or other fasteners.

While tape-on bead has found success and popularity in the market, it has its drawbacks. One problem with the use of paper strips is the scuffing and damage to the paper covering the curved nose of the bead once the bead has been installed on a corner. Because the curved nose portion of the bead is directly exposed, and has no plaster or other material covering the paper, the paper may be easily scuffed or torn with only minimal contact.

Another problem with prior art tape-on bead is the cost of the product. The paper strips must be adhered to the metal bead in a separate step from the formation of the underlying metal corner angle. This additional step can make the end product quite expensive, as compared to conventional bead without the tape-on feature.

Corner bead and other drywall trim products of the prior art have also been extruded from plastic. Plastic is preferable material over metal for a number of reasons. The major reason is the resistance of the material to rust and other natural environmental breakdown. An additional advantage of vinyl, and other plastic products, is the greater dent-resistance than its metal alternative.

The inventor herein developed an improved mud-on bead manufactured entirely of plastic or vinyl, which is the subject of co-pending application Ser. No. 11/375,997. While this co-pending application addresses many of the shortcomings of the prior art, it has been found that even this improved bead could be improved by the provision of more flexible wings or flanges, to more closely conform with the wall surface to which it is attached.

BRIEF SUMMARY OF THE INVENTION

It is therefore a general object of the present invention to provide an improved vinyl bead with flex wings.

A further object is to provide an improved vinyl bead that avoids the problems of a metal bead, but does not have the drawbacks associated with paper wings.

Yet another object of the present invention is to provide an improved vinyl bead that is inexpensive to manufacture, simple to use, and refined in appearance.

These and other objects will be apparent to those skilled in the art.

The plastic bead of the present invention includes an elongated strip of plastic having a nose portion and at least one wing projecting outwardly from a stepped edge of the nose portion. A hinge portion of flexible plastic is interposed between the nose portion and wing, so the wing will closely conform to an associated wall surface, for adhering the wing to the wall surface. In a first embodiment, the bead is co-extruded, with the wing and the nose portion formed of a rigid plastic material and the hinge portion formed of a flexible plastic material. In a second embodiment, the bead is co-extruded, with the nose portion formed of a rigid plastic material and the hinge portion and wing formed of a flexible plastic material.

BRIEF DESCRIPTION OF THE SEVERAL VIEWS OF THE DRAWING

The preferred embodiments of the invention are illustrated in the accompanying drawings, in which similar or corresponding parts are identified with the same reference numeral throughout the several views, and in which.

DETAILED DESCRIPTION OF THE INVENTION

Figure 1:
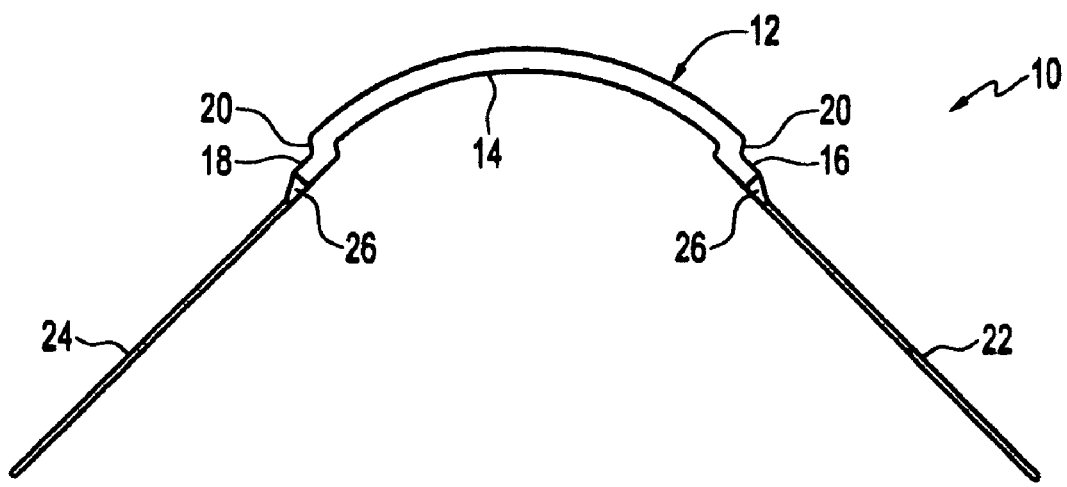
FIG. 1 is an end view of a mud-on vinyl corner bead of the present invention.

Referring now to the drawings, and more particularly to FIG. 1, the vinyl bead of the present invention is designated generally at 10, and is shown in the form of a bull nose corner bead. The terms "plastic" and "vinyl" are used interchangeably throughout this application, and it should be understood that any conventional varieties of rigid plastic material might be used with the present invention as a drywall trim product. In addition, the term "bead" or "corner bead" are used throughout this application as a generic term referring to any of the various types and forms of trim products used in this industry. Thus, "bead" is intended to cover all types of trim products, including, but not limited to, corner beads, angle splay, and trims.

Bead 10 of the present invention is formed from an elongated extruded plastic strip 12, and includes a central arcuate longitudinal channel forming a nose 14, with flanges 16 and 18 extending outwardly from each edge of the channel of nose 14. The nose 14 projects outwardly from the plane of the outward faces of flanges 16 and 18 approximately 0.050 inches, forming a "step" 20 to provide space to receive joint cement or "mud" to thereby "dress" the corner. Nose 14 and flanges 16 and 18 have a thickness of about 0.050 inches. Flanges 16 and 18 extend outwardly from the nose to a distal boundary.

In the prior art, paper strips or "tape" were attached to the flanges of the bead, and would project outward to serve as the basis for securing the bead to the wallboard. In bead 10 of the present invention, these paper "wings" are replaced with very thin plastic wing portions 22 and 24. In order to provide flexibility, a flexible plastic hinge portion 26 is interposed between flanges 16 and 18 and their associated wings 22 and 24. Thus, wings 22 and 24 are formed of the same rigid plastic as nose 14 and flanges 16 and 18, while hinge portions 26 are formed of a flexible plastic material. The entire bead 10 is co-extruded, in order to achieve a single integral structure of plastic of different types. Because most drywall corners do not meet at an exactly perpendicular angle, the flexing or bending at hinge portions 26 will permit the wings 22 and/or 24 to lay flush to the wallboard across their entire surfaces, increasing the strength of the hold of the joint compound securing the bead 10 to the wallboard.

As described above, wings 22 and 24 are integral with and extend outwardly from the hinge portions 26. Wing portions 22 and 24 preferably have a thickness in the range of about 0.008-0.015 inch. Hinge portions 26 taper from the thickness of flanges 16 and 18 to the thickness of the associated wings 22 and 24, to form a smooth transition.

In the method of manufacturing corner bead 10, the bead is heated and co-extruded to form the overall shape, including nose 14, flanges 16 and 18, hinge portions 26 and wing portions 22 and 24. Because hinge portions 26 and wings 22 and 24 are formed as an integral part of the bead 10, the additional expense of adhering paper to the bead is eliminated, and there is no risk of peeling or poor adherence of the wing portions to the flanges—as may occur when paper is adhered to the underlying metal or plastic base.

Bead 10 is applied in the same manner as prior art tape-on beads. First a layer of "mud" or joint compound is applied to the wallboard corner or fed through a commercial hopper. The bead 10 is positioned over the wet mud with the inward faces of the wings and portions of the inward faces of the flanges in direct contact with the mud. Hinge portions 26 permit wings 22 and 24 to come into flush contact with the wall surface and mud, for a more secure adhesion. A finish layer of mud is then applied over the outward faces of flanges 16 and 18 and wings 22 and 24, outwardly from the nose, and feathered outwardly on to the underlying wallboard, to secure bead 10 in place. Once the mud has dried, it is sanded to finish the corner. Additional coats of mud may be applied and sanded as desired.

Figure 2:
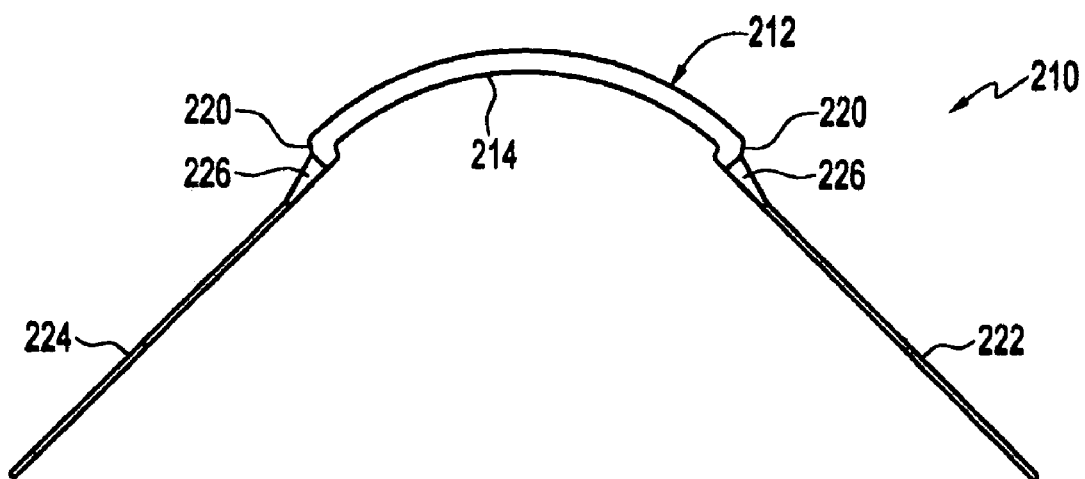
FIG. 2 is an end view of a second embodiment of the mud-on vinyl corner bead of the present invention.

Referring now to FIG. 2, a second embodiment of the mud-on bead of the present invention is designated generally at 210. As with the first embodiment, bead 210 is formed from an elongated co-extruded plastic strip 212, and includes a central arcuate longitudinal channel forming a nose 214. A "step" 220 is formed along each distal edge of nose 214, to provide space to receive joint cement or "mud" to thereby "dress" the corner. In this second embodiment of bead 210, hinge portions 226 extend directly from the steps 220 of nose 214, thereby replacing the flanges 16 and 18 of the first embodiment of bead 10. Thus, flanges 16 and 18 are optional.

Very thin plastic wing portions 222 and 224 are integral with and extend outwardly from the distal edges of hinge portions 226 and are formed of the same flexible vinyl as hinge portions 226. Hinge portions 226 taper from the thickness of the nose 214. As in the first embodiment, the rigid plastic of the nose 214 and the flexible plastic of hinge portions 226 and wings 222 and 224, are co-extruded as a single integral plastic piece. The flexibility of the hinge portions 226 and wings 222 and 224 permits wings 222 and 224 to be placed in flush contact with the wall surface during installation, for stronger adhesion.

It can therefore be seen that the various embodiments of bead 10 and 210 as shown and described throughout FIGS. 1-2, all incorporate the inherent benefits of plastic in a corner bead and trim product. In addition, all of the embodiments of plastic bead 10 may be installed in the same fashion as tape-on bead, without the drawbacks associated with paper strips adhered to either metal or plastic.

Whereas the invention has been shown and described in connection with the preferred embodiments thereof, many modifications, substitutions and additions may be made which are within the intended broad scope of the appended claims.

What is claimed is:

1. A co-extruded plastic mud-on drywall accessory for drywall construction, comprising:
    an elongated plastic core strip of rigid plastic, having a thickness and inward and outward faces, longitudinal first and second edges, and a longitudinal arcuate channel forming a nose portion extending from edge to edge and a length from a first end to a second end,
    at least said first edge of said core strip being formed with an inward step along the length thereof;
    a first hinge portion of flexible plastic integral with the nose portion and extending outwardly along the length of the step; and
    a first integral plastic wing portion having a thickness less than the thickness of the nose portion and in the range of about 0.008-0.015 inch and extending from end to end of the strip and outwardly from the hinge portion;
    said first hinge portion tapered from a thickness of the nose portion to the thickness of the first wing portion.

2. The co-extruded drywall accessory of claim 1, further comprising:
    said second edge of said core being formed with an inward step along the length thereof;
    a second hinge portion of flexible plastic integral with the nose portion and extending outwardly along the length of the second edge step; and
    a second integral plastic wing portion having a thickness less than the thickness of the nose portion and in the range of about 0.008-0.015 inch and extending from end to end of the strip and outwardly from the second hinge portion;
    said second hinge portion tapered from a thickness of the nose portion to the thickness of the second wing portion.

3. The co-extruded drywall accessory of claim 1, wherein said wing portion is formed of the same rigid plastic as the nose portion.

4. The co-extruded drywall accessory of claim 1, wherein said wing portion is formed of the same flexible plastic as the hinge portion.

5. The co-extruded drywall accessory of claim 1, further comprising a first flange projecting transversely outwardly from the first step and interposed between the first step and the first hinge portion, said first flange of the same rigid plastic as the nose.

* * * * *